(12) United States Patent
Gremmert et al.

(10) Patent No.: US 6,501,392 B2
(45) Date of Patent: Dec. 31, 2002

(54) AIRCRAFT WEATHER INFORMATION SYSTEM

(75) Inventors: Scott Gremmert, Redmond, WA (US); Kevin J Conner, Kent, WA (US); C. Don Bateman, Bellevue, WA (US); John Hruby, Monroe, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/907,730

(22) Filed: Jul. 17, 2001

(65) Prior Publication Data

US 2002/0039072 A1 Apr. 4, 2002

Related U.S. Application Data

(63) Continuation of application No. 09/721,294, filed on Nov. 22, 2000, which is a continuation-in-part of application No. 09/461,712, filed on Dec. 13, 1999, now abandoned, which is a continuation of application No. 09/248,367, filed on Feb. 8, 1999, now Pat. No. 6,043,756.
(60) Provisional application No. 60/118,223, filed on Feb. 1, 1999, and provisional application No. 60/074,067, filed on Feb. 9, 1998.

(51) Int. Cl.$^7$ .......................... G01C 21/00; G01C 23/00

(52) U.S. Cl. .......................... 340/971; 340/945; 340/949

(58) Field of Search ................................. 340/971, 945, 340/949, 983; 342/26, 460

(56) References Cited

U.S. PATENT DOCUMENTS

| | | | | | |
|---|---|---|---|---|---|
| 4,163,216 | A | * | 7/1979 | Arpino | 340/870.13 |
| 5,105,191 | A | * | 4/1992 | Keedy | 340/968 |
| 5,434,565 | A | * | 7/1995 | Simon et al. | 340/949 |
| 6,043,756 | A | * | 3/2000 | Bateman et al. | 340/945 |
| 6,070,051 | A | * | 5/2000 | Astrom et al. | 455/12.1 |
| 6,181,260 | B1 | * | 1/2001 | Simon et al. | 340/949 |
| 6,289,277 | B1 | * | 9/2001 | Feyereisen et al. | 701/202 |

* cited by examiner

Primary Examiner—John Tweel
(74) Attorney, Agent, or Firm—Honeywell International, Inc.

(57) ABSTRACT

A system and method that downlinks weather data, generated by existing weather and data sensors, to a groundstation. The groundstation utilizes data from multiple aircraft to form refined weather information, and uplinks the refined weather information to the aircraft. The refined weather information is stored at the aircraft and picture generating equipment, such as an existing on-board ground proximity terrain picture and symbol generator, generates pictorial information depicting the weather information. The pictorial information is displayed, for example by an existing EFIS or weather radar display, in the form of polygons.

36 Claims, 8 Drawing Sheets

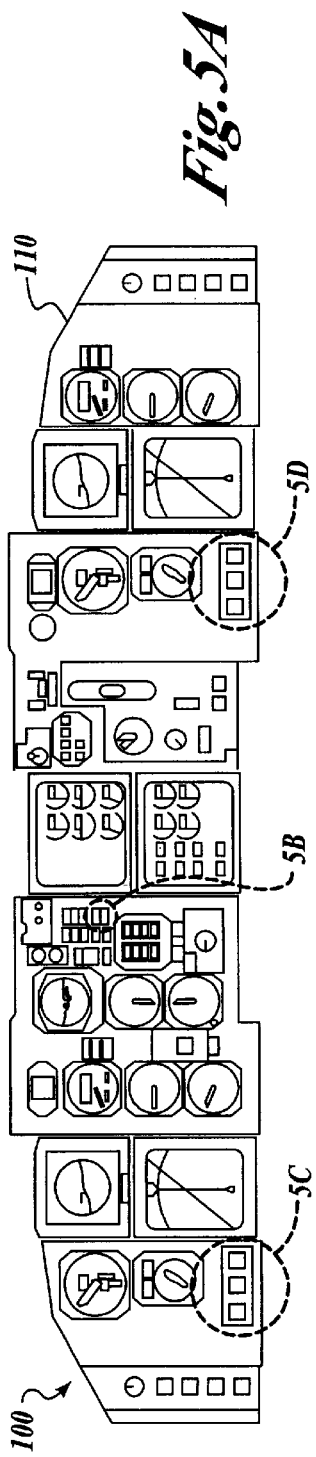
Fig.5A
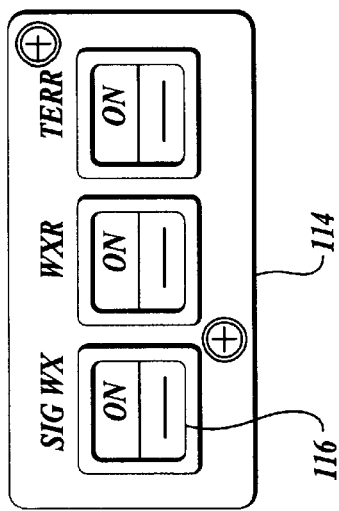
Fig.5C
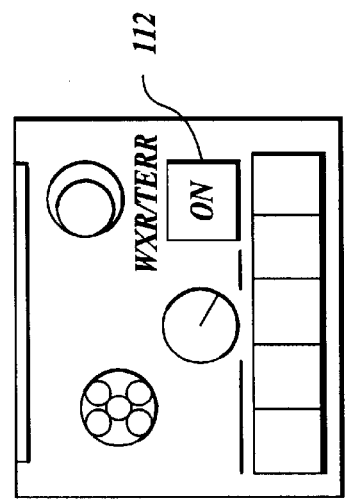
Fig.5E
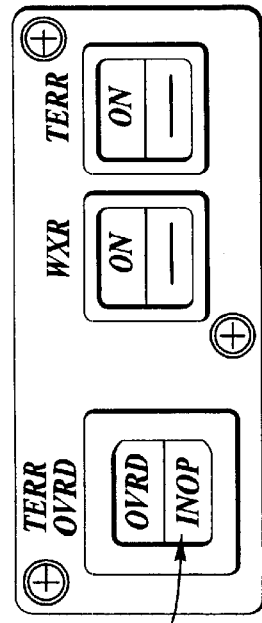
Fig.5D
Fig.5B

AIRCRAFT WEATHER INFORMATION SYSTEM

PRIORITY APPLICATION

This application is a continuation of co-pending application Ser. No. 09/721,294 filed Nov. 22, 2000 which is a continuation-in-part of Ser. No. 09/461,712 filed Dec. 13, 1999 entitled "Synthetic Airborne Hazard Display" now abandoned which in turn claims priority from Ser. No. 60/118,223 filed Feb. 1, 1999, which is a continuation of Ser. No. 09/248,367, now U.S. Pat. No. 6,043,756 filed Feb. 8, 1999 entitled "Aircraft Weather Information System" which claims priority from Ser. No. 60/074,067 filed Feb. 9, 1998, each of which are incorporated herein by reference.

BACKGROUND OF THE INVENTION

The invention relates to delivery of weather product information to the cockpit of an aircraft and in particular to a network architecture and on-board systems for providing real time weather data to an aircraft.

Commercial aircraft operating in United States air space have on-board weather radar systems. Existing on-board weather radar systems provide data on weather local to the aircraft, for example, weather ahead of the aircraft within the range of the weather radar unit. The weather information is displayed on a cockpit weather display. However, the weather data collected by an aircraft is available only to the particular aircraft experiencing the weather, the data is not transferable to the ground or to other aircraft. Thus, today, weather information displayed on on-board cockpit displays is limited to the weather returns supplied by the on-board weather radar.

Visual depictions and bounding of significant hazardous weather areas outside the range of an on-board weather radar system on a cockpit display would be a significant operational tool for the aircraft crew.

Systems for providing an aircraft with weather products outside the aircraft local area have been proposed but posses several limitations. First, dedicated equipment is necessary to implement the systems. This requirement introduces additional cost to the airline operator for acquisition, installation, maintenance, and training and in additional fuel burn due to the additional weight of the equipment. Second, to present the information to the pilot, large quantities of data must be uplinked. The resulting bandwidth requirements make real time weather uplinks impractical, and/or prohibitively expensive, thereby diluting the benefits of such a system.

SUMMARY OF THE INVENTION

The present invention recognizes and resolves significant problems of the prior art by providing an aircraft weather information system wherein weather information is provided to the aircraft from various sources external to the aircraft.

According to one aspect of the invention, local atmospheric data collected by aircraft weather radar systems and other aircraft sensors, including actual aircraft accelerations and other flight data; altitude; and position are down-linked to a groundstation. The down-linked data is assembled with other weather information and an up-to-date atmospheric model is developed. Weather products based on the up-to-date atmospheric model are up-linked to aircraft and displayed in the cockpit. The up-linked weather products can be displayed upon command depicted as bounded polygons on the cockpit display.

According to another aspect of the invention, the weather system of the present invention works with the existing world wide aircraft communications network. This feature of the present invention minimizes the acquisition and operating costs to the aircraft owner while also reducing system infrastructure requirements.

According to yet another aspect of the invention, the present invention is designed and operates so as to be tolerant of the bandwidth and other limitations of the existing aircraft communications network. Data can be compressed and/or the graphics data can be up-linked such that post-processing of the uplinked data can occur aboard the aircraft for generation of the display.

According to another aspect of the invention, the invention includes interactive features that reduce the crew workload in weather monitoring. The system can be configured by crew or ground operations to automatically alert the crew to selected weather threats, such as turbulent conditions or thunderstorm activity. In addition, the system is configurable such that tailored weather information can be transmitted based on aircraft position or flight plan. Destination weather can also be up-loaded for crew viewing. Such features allow weather information to be integrated into real-time flight planning decisions. According to still another aspect of the invention, information currently conveyed to the crew as text, e.g. AIRMET, SIGMET, can now be shown graphically aiding spatial comprehension.

Other advantages and features of the invention will be apparent in view of the following detailed description and appended drawings.

BRIEF DESCRIPTION OF THE DRAWINGS

FIGS. 5A–5E illustrate a typical cockpit installation according to one embodiment of the present invention;

DETAILED DESCRIPTION OF THE PREFERRED EMBODIMENTS

System Overview

In a preferred embodiment of the invention, aircraft collect local atmospheric data, in situ accelerations and other flight data as a function of aircraft position and altitude and down-link this data to a groundstation. The down-linked information is assembled with other available weather data and a current weather model based on, for example, National Center of Atmospheric Research models. In preferred embodiments of the invention, the invention provides multiple weather products, for example, turbulence, position, altitude, winds, temperature, severe cells from weather radar returns and other products. The groundstation up-links the weather products, for example, position, speed and track, and magnitude of significant weather to the originating aircraft and other aircraft. The weather products are received, displayed and stored until the next up-link is received.

Figure 1:
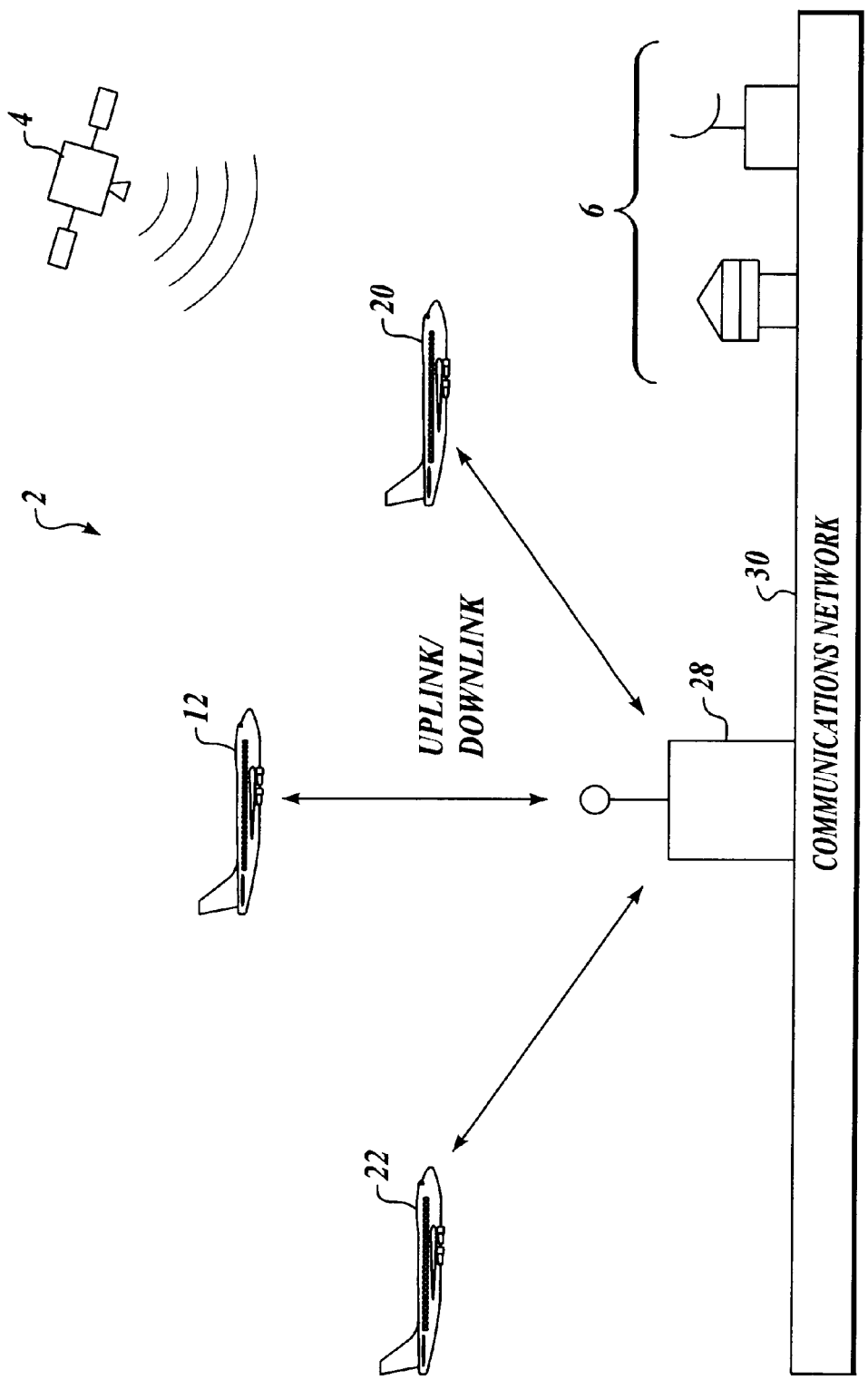
FIG. 1 illustrates a system architecture for a weather information system according to one embodiment of the present invention.

FIG. 1 contains a top level diagram of a weather data communications architecture according to one embodiment of the invention. In the embodiment of FIG. 1, weather data is collected from a plurality of sources. These sources may include satellite sensors 4 and terrestrial weather instrumentation 6. Terrestrial sensors may include weather radar, local observations and other Earth based sensors commonly known to those of skill in the art. Weather data may also be collected by a plurality of aircraft 12, 20 and 22. The data collected from participating aircraft is preferably collected by using standard instrumentation already carried aboard the aircraft. This standard suite of instrumentation typically includes, but is not limited to: a weather radar, a storm scope, navigation systems and an air data computer. The type of weather data available to system 2, can, therefore, include, depending upon sensor availability, the following:

(a) Convective activity (e.g. from Doppler radar measurements);

(b) Turbulence (e.g. from Doppler radar measurement/ downlinked acceleration data);

(c) Winds aloft (e.g. from downlinked data from other aircraft or ground stations);

(d) High surface winds (e.g. from local measurements);

(e) Icing conditions (e.g. from downlinked data and/or infra red measurements);

(f) Precipitation density (e.g. from ground and airborne radar reflectivity data);

(g) Lightning (e.g. from Storm Scope or other sensor);

(h) Cloud density (e.g. from satellite imagery); and (i) Volcanic Ash (e.g. from satellite imagery).

A groundstation 28 receives the weather data via downlink and/or via communications backbone 30. Communications backbone 30 may comprise a fiber optic network, telephone system, internet, radio or cell phone link or any other such communications network known to those of skill in the art. Groundstation 28 may also incorporate into the compiled data any available pilot reports (PIREPS) or other reported observations in addition to the data described above. Groundstation 28 then processes the available weather data for uplink to participating aircraft.

The uplinked weather data received at the aircraft is then further processed and displayed in a cockpit display. The various threat conditions are communicated to the pilot by drawing patterned polygons, for example, in place of the weather radar/terrain awareness display. Thus the pilot sees a series of two-dimensional figures in a plan view. The threat display is scaled and rotated just as the weather radar and terrain awareness are, so the pilot can easily see the relationship of his short-term path to the meteorological threats around him. Use of the graphical polygons enables the crew to distinguish between locally sensed data such as weather radar and the processed weather model data.

In one possible embodiment, the uplinked weather threats are a display mode mutually exclusive with airborne weather radar and terrain awareness. In such an embodiment, one pilot would monitor the terrain display while the other monitors one of the weather displays. In another possible embodiment, each of the display modes can be integrated on a single display with the graphical weather patterns displayed with sufficient transparency that the underlying terrain shows through.

Ground Station Operations

Figure 2:
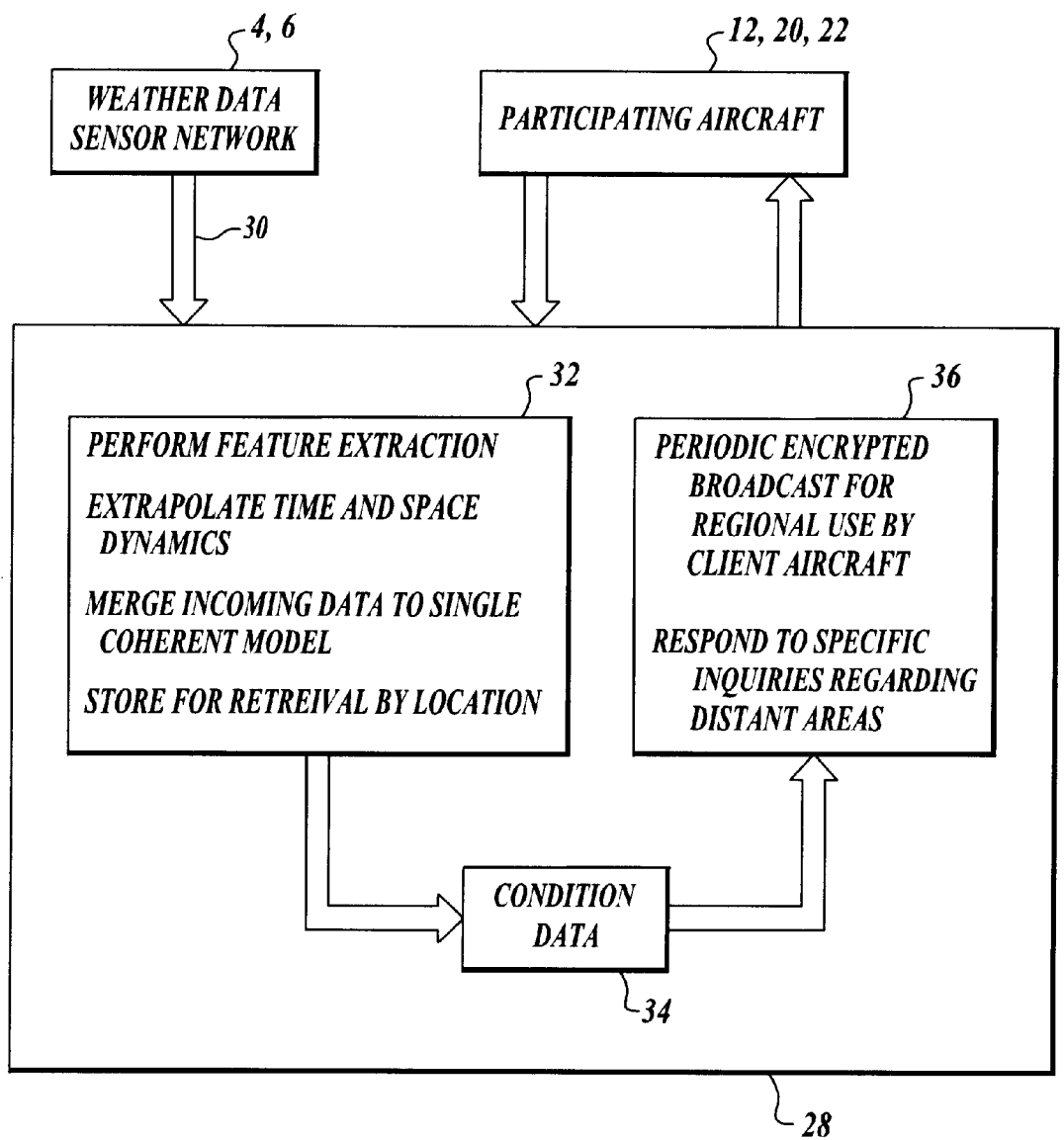
FIG. 2 is a functional block diagram of ground station operations according to an embodiment of the present invention.

FIG. 2 describes the processing of the weather data by groundstation 28 in greater detail. As shown in FIG. 2, operations at groundstation 28 may be logically subdivided into a weather data collection and modeling function 32; a data storage function 34 and a data output function 36. For purposes of this document, each of these functions are shown collocated at a single facility for convenience of explanation.

Modeling function 32 receives the weather observation and sensor data via communications network 30 and/or via downlink from participating aircraft. The sensor data is received in a variety of native formats such as, for example, bit maps (BMP), JPEG image files, computer file formats, as well as various proprietary text and binary formats. Function 32 uses pattern recognition techniques to extract the pertinent weather phenomenon data from the received data and store the resulting data in a common format. The composite, common format, data is preferably in a compact binary form and optionally indexed by type, time, location, source and severity. The degree of time and location indexing may be tailored to provide the level of granularity desired. A basic system may be implemented with a lower amount of indexing and cross reference than can a highly interactive system in which pilots initiate requests for dynamic weather data for a particular region.

A link to the originating source file may be additionally provided in the composite data. In a preferred embodiment of the invention, the source file is archived for a 72 hour period. The archiving process facilitates integrity audits of system 2 as well as providing background history data to assist with investigation of an accident or incident.

After converting the received data to a common file format, function 32 merges the data into a coherent model by geographic region. The first step in the merge process is spatial registration. In a preferred embodiment of the invention, the data is converted to uniform global coordinates; for example, WGS-84 latitude/longitude, MSL altitude and universal time (UTC).

The conversion to uniform coordinates involves a number of uncertainties. For example, if the weather radar return of a storm is transmitted by an aircraft, there is uncertainty in the aircraft's own position report, due to navigation errors such as, for example, due to inertial reference system drift. There is also uncertainty in the actual distance represented by each radar range bin, due to various hardware factors. The image data from the aircraft can be compared to a geo-referenced picture such as NexRad, and the errors estimated and subtracted out. Even if no geo-referenced picture is available, if enough independent measurements of the storm are received, the true location can be narrowed through use of averaging or voting algorithms, commonly known to those of skill in the art.

After the weather data is spatially referenced, function 32 identifies and eliminates spurious and duplicate reports. Once a reference model of the local weather is developed as described above, the errors contained in each additional downlinked report of the weather phenomenon are characterized. If these errors are within an estimated error budget, the errors will be subtracted from the data, and the result will be used to update the reference model. In a preferred embodiment of the invention, this process is used to merge multiple reports of the same phenomena into a single entity and simultaneously eliminate duplicate reports. If the estimated error exceeds the estimated error budget, the report is categorized as either the first report of a new phenomena, e.g. a new storm cell, or as a spurious/erroneous report, and discarded.

To minimize the quantity of information uplinked to receiving aircraft, the modeling function of process 32 incorporates rate information into the model. Thus, the model incorporates and uplinks both current state data and rate values such that a computer or other logic device on-board the receiving aircraft can estimate the storm's current character even though the last weather update received is a few minutes old.

Rate data is collected at each sensor platform. For example, the rate of change in intensity is estimated by taking the average difference in intensity levels for the same part of the storm over time after adjusting for position changes. Examples of other rates that can be used to form a predictive model include speed and direction, change in size, decrease in visibility, increase in rain rate, intensity of hail storm, and turbulence level. The resulting predictive data is assumed to be valid for a specified interval, usually a few minutes. Rate data is continually updated by newly received measurements and used to update the predictive model.

Once a coherent current state and predictive weather model(s) are developed by process 32, the condition data/mode is stored for later retrieval and/or transmission in a storage device 34.

A weather reporting broadcast function 36 retrieves the models for broadcast to participating aircraft. The broadcast can be sent in the clear as a public service, or encrypted for use only to paid-up subscribers. Weather data can also be formatted for transmission in a variety of ways. For example, frequency congestion in the vicinity of airports makes point-to-point communication difficult and necessarily very short. Since all aircraft in the vicinity of the airport will likely want to the same information, an automated general broadcast has the advantage of reducing frequency congestion. In a general broadcast, a transmission describing local conditions for an area of 300–500 miles, for example, is transmitted from groundstation 28. For VHF broadcasts, the broadcast range would comprise a radius of about 100–200 miles. Broadcasts would preferably occur on a pre-arranged schedule of, for example, every 15 minutes.

In a point-to-point broadcast, the crew of subscribing aircraft can initiate a request for particular weather information. This tailored broadcast allows the aircrew to plan alternates or make flight plan deviations long before they actually encounter severe weather.

If groundstation 28 has beforehand knowledge of an aircraft flight plan, the weather information can be broadcast as an unsolicited uplink. In this embodiment, system 2 is configured at the time a departure clearance is issued and transmits information pertinent to the intended route of flight. System 2 may optionally be configured to transmit data at points along the route of flight. Hazardous weather data could therefore be brought to the pilot's attention at departure, or could otherwise be stored and updated for retrieval enroute.

In lieu of the model data, native source images may optionally be transmitted to the aircraft in those instances where the flight crew requires raw weather information instead of processed weather images. In this embodiment, the native source images can be compressed for transmission efficiency, and then decompressed at the receiving platform. Two compression/decompression formats useful in this embodiment and widely known to those of skill in the art include MPEG-2 and MPEG-4.

To minimize frequency congestion, the reporting broadcast function 36 may optionally make use of coasting techniques. Coasting techniques utilize the principle that natural phenomenon have inertia, and that over the time period of relevance to the present invention, e.g. 5 to 30 minutes, the rate of change in the measured weather parameter is relatively constant. Other phenomenon, however, develop and dissipate in less time. Thus, the coasting principle can be employed to vary the content and/or number of data uplinks/downlinks between the aircraft and groundstation while still maintaining an accurate model of the weather.

Aircraft Components and Operation

Figure 3:
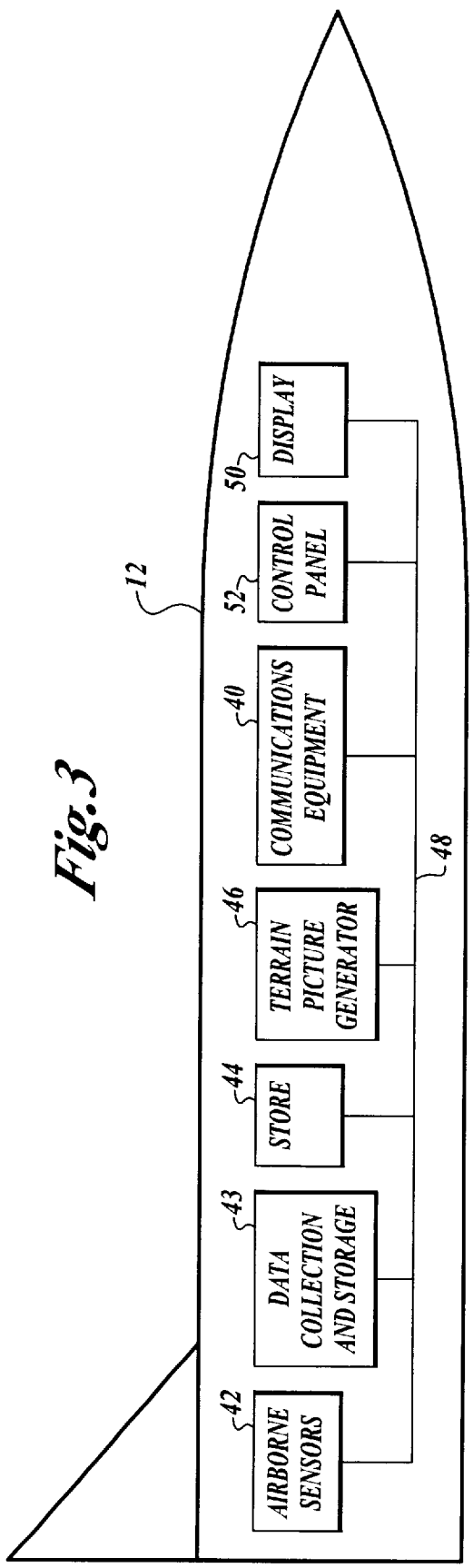
FIG. 3 is a functional block diagram of an aircraft weather information system according to an embodiment of the present invention.

FIG. 3 contains a functional block diagram of the aircraft portion of the weather data system of the present invention. Weather data uplinked from groundstation 28 is received aboard the aircraft by communications gear 40. Communications gear 40 is also used to downlink weather data collected by airborne sensors 42 to groundstation 28. The uplink/downlink of the composite weather data according to the present invention is more efficient and less expensive than systems not incorporating the invention, regardless of the spectrum used. However, according to a preferred embodiment, the weather data is preferably transmitted/received to/from communications gear 40 and groundstation 28 on a spectrum for which transmit and receive capability already exists aboard the aircraft. This embodiment avoids the need for the acquisition of additional communications equipment and infrastructure. For example, in a preferred embodiment of the invention, the aviation portion of the VHF spectrum is utilized to transmit and receive data. Aircraft already have communications gear 40 to transmit and receive on those frequencies. This gear typically exists in the form of, for example, VHF communications radios, an Airborne Communications and Reporting System (ACARS) and/or an Automatic Flight Information System (AFIS).

Communications gear 40 routes the uplinked weather data to a data collection and storage device 43. Device 43 contains code/instruction sets for decompressing the data received and for utilizing rate and trend data to periodically update the weather data provided to the crew without the need for continual real time updates. Device 43 may additionally be used to format data collected by on-board sensors 42 for later downlink by communications gear 40.

Decompressed and processed uplink data is then written to a storage device 44 where it is accessed by a picture generator 46 and converted to a graphical depiction. The graphical depiction is then transmitted via a bus 48 for display on one or more cockpit color display devices 50.

In a preferred embodiment of the invention, bus 48 comprises an existing weather radar video data bus. Weather radar video data bus 48 may comprise, for example, a video data bus compliant with Aeronautical Radio, Incorporated (ARINC) standard 453. Such a video data bus incorporates a limited palette of colors and has limited band width capabilities. Fabrication of the unique polygon-shaped icons which depict and bound significant hazardous weather areas is bounded by these video data bus limitations. Implementation of the invention using other video data buses is possible, however, and the invention itself is not so limited. For example, an ARINC 429 bus can be used. In one embodiment of the invention, data is sent to display 50 on one bus and responses on a separate bus. The invention preferably operates using a bus architecture independent of the system level data bus and symbol generators.

Display 50 may comprise any cockpit display cable of displaying graphical symbols. Display 50 is preferably a color display. A weather radar display or terrain awareness display or Electronic Flight Information System (EFIS) display are examples of display devices that may be used to display the weather data of the present invention. A control panel 52 may be used to control operation of display 50; to control the display format and contents; and to request various types of uplinked products.

According to an embodiment of the present invention, control panel 52 may be additionally used by the crew to make data requests to groundstation 28. Such requests may include:

a.) request for a picture of weather outside the local area;

b.) request for a picture of the native (raw) data;

c.) request for a depiction of trends, particularly animated depictions;

d.) request for details (textual or otherwise) behind a storm icon;

e.) request for a particular warning level or sensitivity setting.

Weather data requests for a particular distant area, such as the destination airport area, improves enroute planning for diversions and emergencies.

Figure 4:
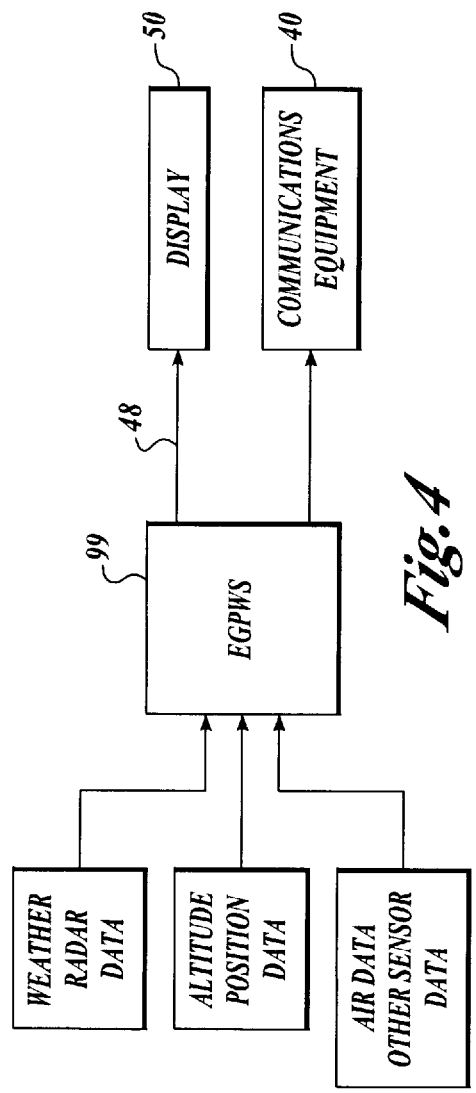
FIG. 4 is a block diagram of an alternative embodiment of an aircraft weather information system according to an embodiment of the present invention.

FIG. 4 illustrates an alternative embodiment of the system elements carried aboard the aircraft. The present invention recognizes that the on-board portion of the system may be implemented by executable code, an electronic circuit or general purpose processor and furthermore, that such devices are already present aboard the aircraft. In the embodiment of FIG. 4, an Enhanced Ground Proximity Warning System (EGPWS) also known as a Terrain Awareness System (TAWS) computer 99 normally utilized for ground collision avoidance is additionally tasked with performing certain processes related to the present invention. As typically installed on-board the aircraft, EGPWS computer 99 is already wired to receive altitude, position, and air data computer information from the sensors and navigation systems aboard the aircraft. In the embodiment of FIG. 4, EGPWS computer 99 additionally receives radar data from a weather radar. EGPWS computer 99 also contains a processor and memory which can be used to perform tasks associated with operation of the present invention. The EGPWS computer 99 further includes display drivers useful for driving cockpit display 50. In the embodiment of FIG. 4, EGPWS computer 99 is additionally coupled to communications gear 40, which may be, for example, an ACARS. Thus, with the addition of a weather radar input, an ACARS interface and an executable code to perform the functions of the present invention, the EGPWS computer 99 can be readily and easily modified to serve as the on aircraft component of the present invention. The embodiment of FIG. 4 thus possesses the advantage of eliminating any requirement for the purchase, maintenance and installation of additional equipment to perform the airborne functions of the present invention.

In a preferred embodiment of the invention, the on-board systems additionally process the uplinked weather data to alert the crew to potential hazards along the route of flight. The weather reference model for the area along the flight path, the aircraft state data (e.g. position, speed), and the aircraft flight plan data are combined to predict whether the aircraft will encounter any storms or other adverse conditions if it continues on the current flight path. The invention checks in small steps along the predicted path to see whether a protection envelope intersects the space that will be occupied by a phenomena in the reference model when the aircraft gets to that position and outputs an alert when the envelope and phenomenon intersect.

The protection envelope comprises a volume of space, preferably a few miles horizontally and a couple thousand feet above and below the aircraft's altitude. Depending on the type of phenomenon, the vertical extent for alerting purposes might be significantly larger than the storm itself, to account for uncertainties in measurements, drift over time, and invisible side-effects. For example, the vertical extent of a convective storm cell might be modeled as going from ground level up to 30,000 feet, even if the tops of the clouds present only extend to 18,000 feet, due to knowledge that convective cells create invisible disturbances at an appreciable distance in all directions. In contrast, a clear-air-turbulence phenomena may have a vertical extent of only a couple thousand feet if it is created by shear layers. This bounding would be added to the reference model if aircraft flew over or under the reported disturbance without encountering any turbulence.

The trigger level for alerting preferably varies by aircraft type, by airline policy, and/or by crew preference. Although described in the context of the on-board aircraft systems, the alerting function of the present invention may optionally or additionally be performed at a ground location and uplinked to the aircraft. The invention's ability to control warning levels, alerting volumes, prediction times, and other variables increases system utility, minimizes false alarms, and enhances crew acceptance.

Another embodiment of the invention allows the retention of crew interactive settings, with automatic retrieval at set times or events. Activation of the retained settings can be triggered by, for example, crew self-identification, phase of flight, altitude, deviation from flight plan, local traffic density, proximity to terrain, emergency events such as engine or pressurization failure, changes in squawk code, or other factors that indicate a change in crew workload and an increase or decrease in the relative importance of weather information.

In another embodiment of the invention, the invention monitors for communications failures, and alerts the crew to loss of the invention's predictive/alerting abilities when the outage is of sufficient duration and a potential weather threat exists. In this manner, short term communications loss does not trigger a nuisance alert that might unnecessarily distract the crew.

Once an encounter with adverse conditions is predicted, the crew is alerted via aural message, an alert lamp, text message, graphics, or other means. The crew can then consult the graphic display for more information. Optionally the crew can call up additional background information e.g. text readout of intensity levels, or the raw image from which the graphical display was developed. Raw data viewing gives flight crews tools that build confidence in the invention and audit its performance. Requests for details behind the storm icons raises flight crew confidence level that the computer is making the same decisions about severity that the crew would have made in its place. This feature can optionally provide details that are not currently viewable to the crew, which can assist in the refinement of algorithms. The crew can then use the alert and any additionally requested data to decide whether or not to make a change to the aircraft altitude, direction, speed, destination, or take other actions within the crew's control.

Graphical Weather Depiction and Display

In a preferred embodiment of the invention, unique polygon-shaped icon images depicting and bounding significant hazardous weather are shown on cockpit display 50. Each unique polygon image uniquely depicts a specific significant weather hazard area, for example, convective hazard areas, potential turbulence areas, winter precipitation areas or icing areas. According to one embodiment of the invention, significant weather is displayed to a minimum range of 320 nautical miles along the aircraft's flight path. According to another embodiment of the invention, significant weather is displayed to a minimum range of 640 nautical miles along the aircraft's flight path.

FIGS. 5A–5E illustrate a typical cockpit installation 100 of the present invention. The particular cockpit installation depicted in FIGS. 5A–5E is a retrofit installation wherein an aircraft instrument panel 110 includes a ground proximity warning system accessed by weather radar/terrain switch 112. The pilot's ground proximity warning system switch panel 114 is modified to incorporate an on/off switch 116 whereby the pilot accesses the significant weather data upon command. Instrument panel 110 includes ground proximity warning system switch panel 118.

The icons displayed on display 50 are a variety of polygons unique to a specific significant weather hazard, for example, convective hazard areas, potential turbulence areas, winter precipitation areas or icing areas. According to one embodiment of the invention, the icons are two-dimensional (2D) images indicating the weather hazard's geographic location relative to the aircraft. According to another embodiment of the invention, the icons are three-dimensional (3D) images indicating the weather hazard's altitude in relation to the aircraft altitude and in addition to the weather hazard's relative geographic location.

The patterning algorithm used to display weather information includes rules to insure that the full boundary is always drawn, regardless of range/scale, and to make sure that pattern density is always in range of 1:4 to 1:8. Higher density has been found to clutter the display and obscure the terrain, while lower densities have been found to not convey the full severity of the threat in a single glance. The exact pattern shape and density is configurable according to customer and local regulatory preference.

Figure 6:
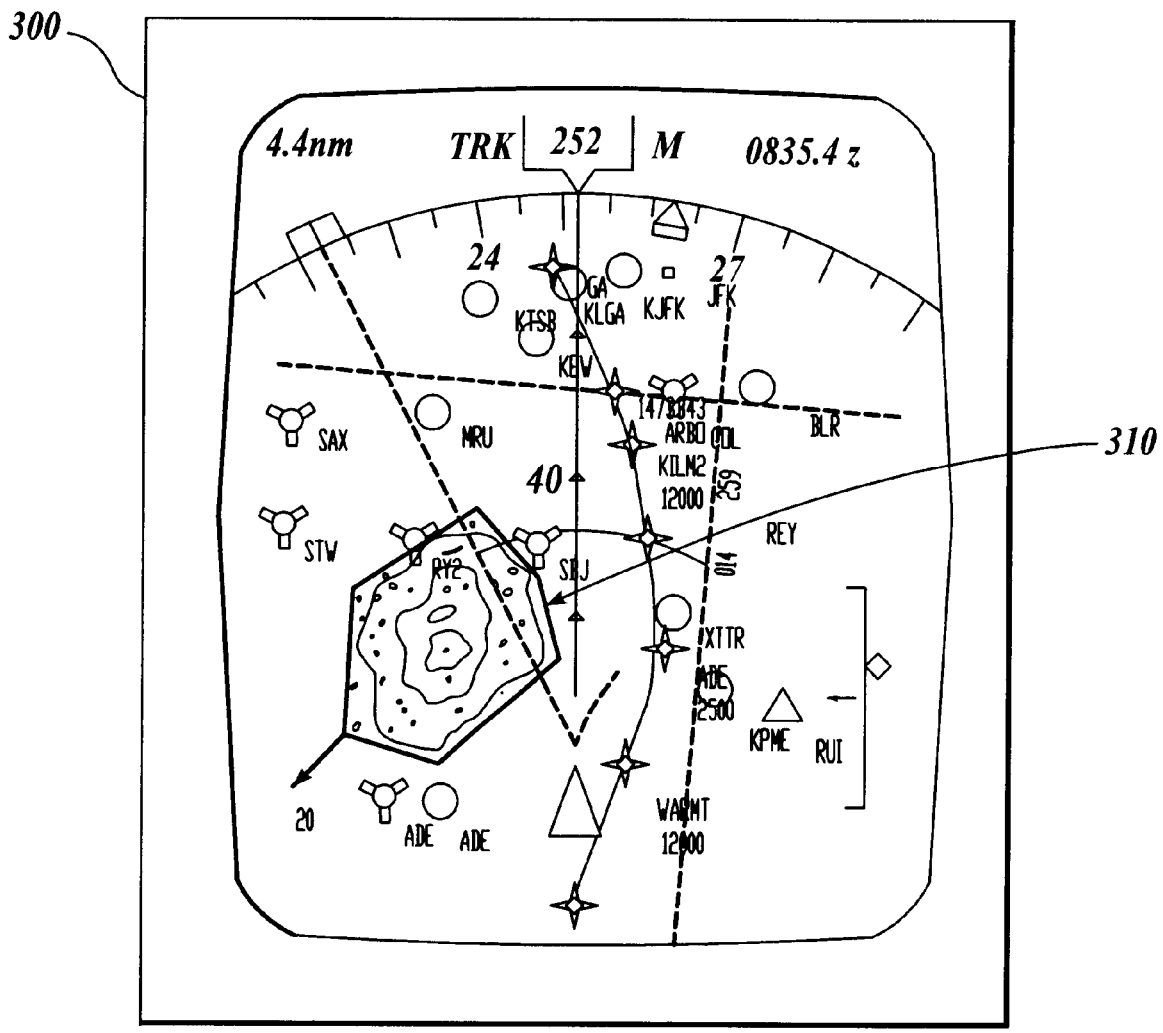
FIGS. 6 and 7 show examples of weather polygons according to one embodiment of the present invention.
Figure 7:
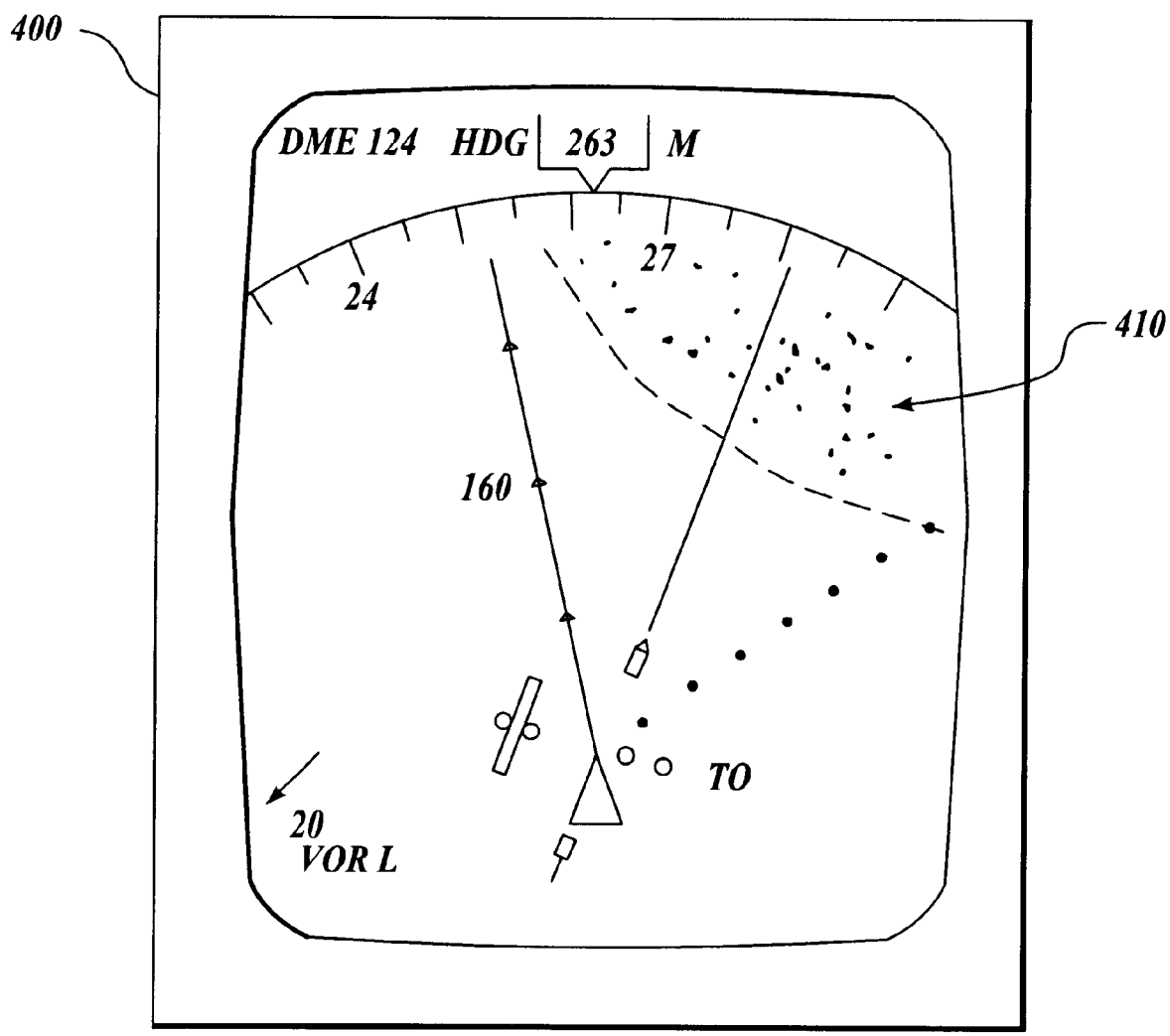

FIGS. 6 and 7 show examples of weather polygons according to the invention. FIG. 6 illustrates a cockpit display 300 selected to display data within an eighty nautical mile range of the aircraft. FIG. 6 includes an example of an unique 2D polygon-shaped image 310 depicting a predicted hazardous convectivity activity area. According to the invention, polygon-shaped image 310 is displayed in color, for example, polygon-shaped image 310 is displayed as a red polygon shape with red color dots. According to one preferred embodiment, the weather radar returns of cells lying within the hazardous convectivity activity area are displayed inside polygon-shaped image 310.

FIG. 7 illustrates another cockpit display 400 according to one embodiment of the invention selected to display data within a three hundred twenty nautical mile range. FIG. 7 includes an example of an unique 2D polygon-shaped image 410 depicting a predicted turbulence area. According to the invention, polygon-shaped image 410 is displayed in color, for example, polygon-shaped image 410 is displayed as a yellow polygon shape with yellow color dots.

Figure 8:
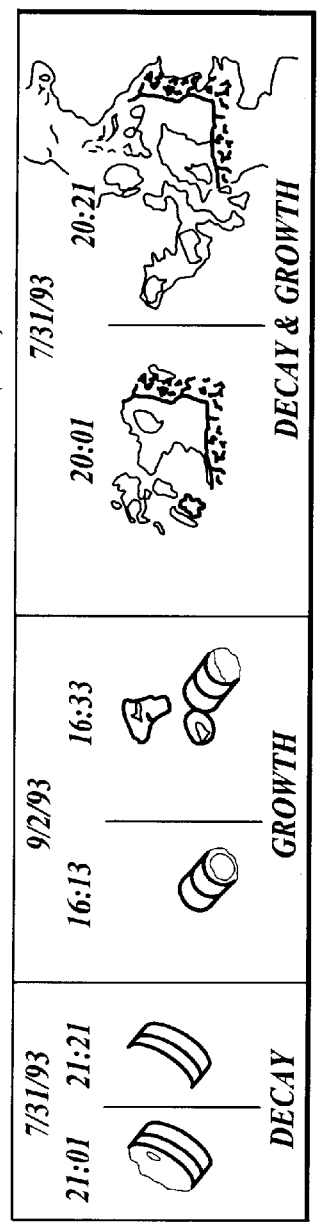
FIG. 8 illustrates a current weather product.
Figure 9:
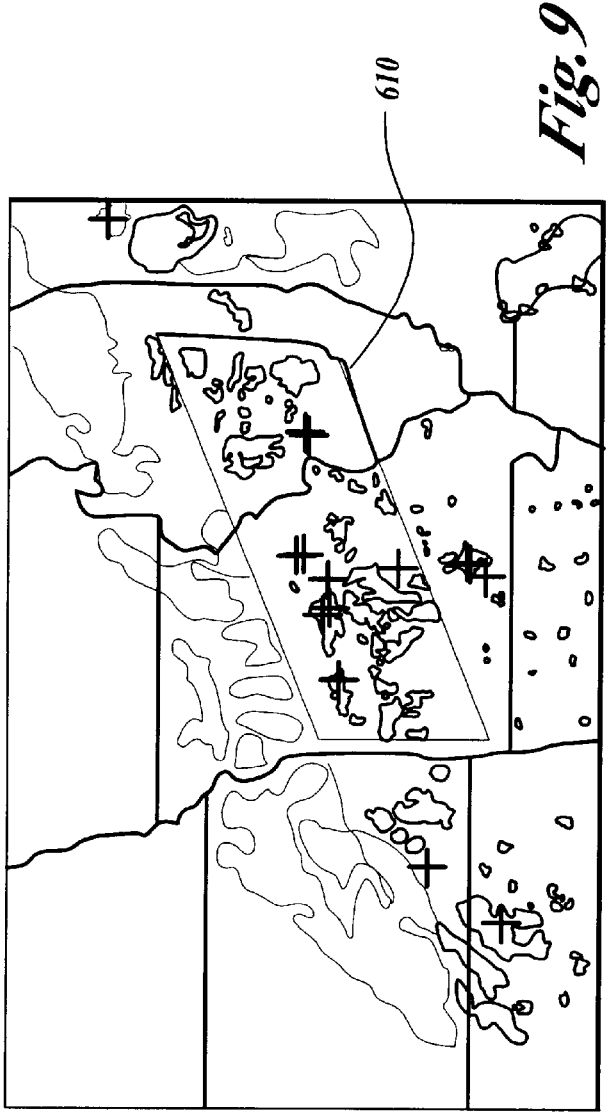
FIG. 9 illustrates another current weather product, including an example of a weather polygon according to one embodiment of the present invention.

FIGS. 8 and 9 illustrate two current weather products which are incorporated into the invention. FIG. 8 illustrates a storm extrapolated position (SEP) 500 indicating the growth and decay of a weather area. FIG. 9 illustrates a convective SIGMET 600 which is a weather advisory concerning weather significant to the safety of all aircraft. For example, convective SIGMETs are issued for tornadoes, lines of thunderstorms, embedded thunderstorms of any intensity level, areas of certain thunderstorms and hail ¾ inch or greater. FIG. 9 includes another example of an unique 2D polygon-shaped image 610 depicting a convective SIGMET. According to the invention, polygon-shaped image 610 is displayed in color, for example, polygon-shaped image 610 is displayed as a red polygon shape with red color dots.

According to one possible embodiment of the invention, storm dynamics can also be depicted on the display. Methods for graphically displaying storm dynamics include:

(a) using different fill patterns to indicate storm state overtime;

(b) using animation to show storm state over time;

(c) using different colors to indicate past/future storm state values; and (d) using transparency to indicate past/future storm position.

Fill patterns, colors, and/or transparency are preferred methods for displaying changes in storm position and optionally in storm size. Animation is preferably used to graphically display changes in weather intensity and is especially useful for displaying changes in intensity on slow moving cells. On older, or rudimentary display systems, a frame-by-frame animation may be used wherein the crew changes to the next or previous frame by interactive methods and waits for the picture to generate.

Use of a dynamic display enables better decision making by the flight crew. The dynamic display allows the crew to take into account, not only the current status of the storm, but also the state and/or position of the storm at a future time and/or points in the future. Course corrections and deviations as well as go/no go decision can therefore be made more effectively.

Data Packet Formats and Transfer Protocols

In a preferred embodiment of the invention, the invention makes use of ACARS, AFIS, Gatelink, and similar charge-per-use communication channels to transmit the weather product information. Minimizing the uplinked data volume is therefore desirable to reduce costs. The present invention utilizes several techniques as described below to place the weather data into the smallest possible data packets.

In one possible embodiment of the invention, the weather data is uplinked using the Aviation Weather Information Network (AWINS) format. Use of the AWINS general format has the advantage of allowing inoperability between first-generation equipment and evolutionary upgrades. All the polygons depicting the weather data for a geographical region according to the present invention are packed into a single message that ranges from 2 to 3300 bytes, as shown in Table I. The message comprises 3 fields: A control ID field; a length field; and the package data field. The structure and organization of the control ID field is shown in Table II and identifies whether the package data field contains surface observation data or weather volume data. According to one possible embodiment of the invention, the control ID field may be used by the on-board system to identify message data the on-board system is unable to interpret. Any such message data fields can be skipped over.

TABLE I

MESSAGE FIELDS

| BYTE | LINEAR BITS | DEFINITION | NOTES |
|---|---|---|---|
| 1 | 8:1 | Control ID | See table II |
| 2 ... | | Length | See description below |
| ... N | | Package data | |

TABLE II

MESSAGE CONTROL ID FIELD CONTENTS

| Control ID | Package Data |
|---|---|
| 1 | Weather Volume Package |
| 2 | Surface Conditions Package |

The length field specifies the length of the entire package in bytes. If the byte is less than or equal to 127, then this is the least significant 7 bits of the length. If the length is greater than 127, the least significant 7 bits are retained as the most significant part of the length and an additional byte is read.

Algorithmically, reading the length is as follows:

Clear Accumulator

While (Length byte>127)

{Shift least significant 7 bits of length onto accumulator. A=(A<<7)|(LEN&0X7F); Read next length byte}

Use least significant 7 bites as least significant 7 bits of accumulator.

Accumulator contains length of message in bytes, including the length and control ID fields.

As described in Table II, the package data may include one of a weather volume data or in surface conditions data. The weather volume package is further subdivided into a plurality of blocks as shown in Table III. Details of the block contents are shown in Tables IIIA–IIIE.

TABLE III

WEATHER VOLUME PACKAGE BLOCK DESCRIPTION

| Block | Notes |
|---|---|
| Type/Severity | See Table IIIA |
| Expiration | See Table IIIB |
| Altitude | See Table IIIC |
| Wind Vector | See Table IIID |
| Area | See Table IIIE |

The type/severity block defines the type of weather and its degree of hazard. Table IIIA shows that the type/severity block may be further subdivided into two fields.

TABLE IIIA

TYPE/SEVERITY BLOCK

| BYTE | LINEAR BITS | DEFINITION | NOTES |
|---|---|---|---|
| 1 | 5:1 | Type | See Table IIIA-1 |
| 1 | 8:6 | Severity | 0 to 7 (aircraft dependent interpretation) |

The field of the weather volume package indicates the type of weather according to the protocol outlined in Table IIIA-1 below.

TABLE IIIA-1

WEATHER VOLUME TYPES

| Type | Description | Symbol Depiction |
|---|---|---|
| 0 | Convective Activity | '/' |
| 1 | Turbulence | '^' |
| 2 | Icing | 'v' |
| 3 | Lightning | '!' |
| 4 | Windshear | 'X's |
| 5 | Volcanic Ash | |
| 6 | Rain | ',' |
| 7 | Snow | '*' |
| 8 | Hail | |
| 9 | Winds | |
| 10–31 | Spare | |

As may be seen from the table, each of various types of weather phenomenon may be depicted with a symbol. Additional phenomenon other than those listed in Table IIIA-1, may be included through use of the unalloted fields 10–31.

The severity field of the Type/Severity block of Table IIIA can be used to assign a relative threat level that the particular phenomenon presents to the aircraft. For each of the weather phenomenon indicated by the type field a numeric severity indication is assigned as, for example, in Table IIIA-2.

TABLE IIIA-2

WEATHER VOLUME SEVERITY

| Severity | Description |
|---|---|
| 0 | Negligible for light aircraft |
| ... | ... |
| 7 | Extreme for Heavy aircraft |

The numeric severity is interpreted by the aircraft terrain picture generator, for example, to code the graphical depiction of the weather according to the degree of hazard for that aircraft. Table IIIA-3 describes one possible color coding scheme for representing the relative hazard to the aircraft.

TABLE IIIA-3

AIRCRAFT SEVERITY LEVEL SYMBOL DEPICTION

| Aircraft Severity level | Symbol Depiction |
|---|---|
| Negligible | Not depicted |
| Light | Green |
| Moderate | Yellow |
| Severe | Red |
| Extreme | Bold Red/Magenta |

For example, a 737 encountering turbulence having a severity level of 2 in Table IIIA-2 might not display such a phenomenon on its cockpit display since the relative severity is negligible per Table IIIA-3. However, a light aircraft encountering the same phenomenon might depict the phenomenon in green since it poses a light threat to the aircraft. The aircraft severity level can also be used to automatically display to the pilot that weather having an aircraft severity exceeding a predefined value.

The expiration block defines the time in UTC at which the message data was taken and the time period past when it should no longer be used. Since there exists an inherent potential confusion as to whether a time is an hour ago or 23 hours from now, the time periods as given in Table IIIB are interpreted as lying somewhere within the sliding window that begins four hours prior to and twenty hours ahead of the current time.

TABLE IIIB

WEATHER VOLUME PACKAGE EXPIRATION BLOCK

| BYTE | LINEAR BITS | DEFINITION | NOTES |
|---|---|---|---|
| 1 | 8:1 | Initial Time | LSB = 0.1 hrs |
| 2 | 16:9 | Expiration Time | LSB = 0.1 hrs |

The altitude block defines the top and bottom elevations of the volume containing the weather phenomenon. Table IIIC describes one possible implementation of the altitude block according to the present invention.

TABLE IIIC

WEATHER VOLUME PACKAGE ALTITUDE BLOCK

| BYTE | LINEAR BITS | DEFINITION | NOTES |
|---|---|---|---|
| 1 | 8:1 | Top of Volume | 250 ft. LSB Range: −4,000 ft to 60,000 ft |
| 2 | 16:9 | Bottom of Volume | 250 ft LSB Range: −4,000 ft to 60,000 ft |

The wind vector block contains data on wind direction and speed. According to the implementation as described in Table IIID below, the data is provided with a resolution of 1.4 degrees and 2 knots, respectively.

TABLE IIID

WEATHER VOLUME AND SURFACE CONDITION PACKAGE WIND BLOCK

| BYTE | LINEAR BITS | DEFINITION | NOTES |
|---|---|---|---|
| 1 | 8:1 | Wind Direction | LSB = 360/256 (1.4 degrees) |
| 2 | 16:9 | Wind Speed | LSB = 2 Knots (0 to 510 knots) |

The area block is used to define the plan view area occupied by the described weather phenomenon. As provided in TABLE IIIE-1, the area may be described through use of common geometric shapes.

TABLE IIIE

WEATHER VOLUME AND SURFACE CONDITION PACKAGE AREA BLOCK

| BYTE | LINEAR BITS | DEFINITION | NOTES |
|---|---|---|---|
| 1 | 8:1 | Type | See Table IIIE-1 |
| 2 | 8:1 | Area Sub-Type data | |
| — N | | | |

To reduce the amount of bandwidth and data required to define the areas of Table IIIE-1, a preferred embodiment of the invention specifies the area dimensions according to the techniques and tables described below.

TABLE IIIE-1

AREA TYPE

| Area Type | Description |
|---|---|
| 0 | Circle |
| 1 | Rhombus |
| 2 | Triangle |

TABLE IIIE-1-continued

AREA TYPE

| Area Type | Description |
|---|---|
| 3 . . . 127 | Polygon of 2 . . . 127 points |
| 128 . . . 255 | Spare |

A circle of area containing a weather phenomenon is further located and bounded by a vertex and a radius as shown in Table IIIE-2 and Table IIIE-3.

TABLE IIIE-2

CIRCLE DESCRIPTION FIELDS

| BYTE | LINEAR BITS | DEFINITION | NOTES |
|---|---|---|---|
| 1–4 | 32:1 | Vertex | See Table IIIE-3 |
| 5 | 40:33 | Radius | LSB = 0.5 nm Range: 0 to 127.5 nm |

TABLE IIIE-3

CIRCLE VERTEX DEFINITION

| BYTE | LINEAR BITS | Definition |
|---|---|---|
| 1,2 | 16:1 | Latitude |
| 3,4 | 32:17 | Longitude |

The latitude and longitude of Table IIIE-3 are scaled with LSB=360°2^16=0.00549316 degrees. This embodiment therefore provides a range of +179.9945 to (−) 180 degrees.

Figure 10:
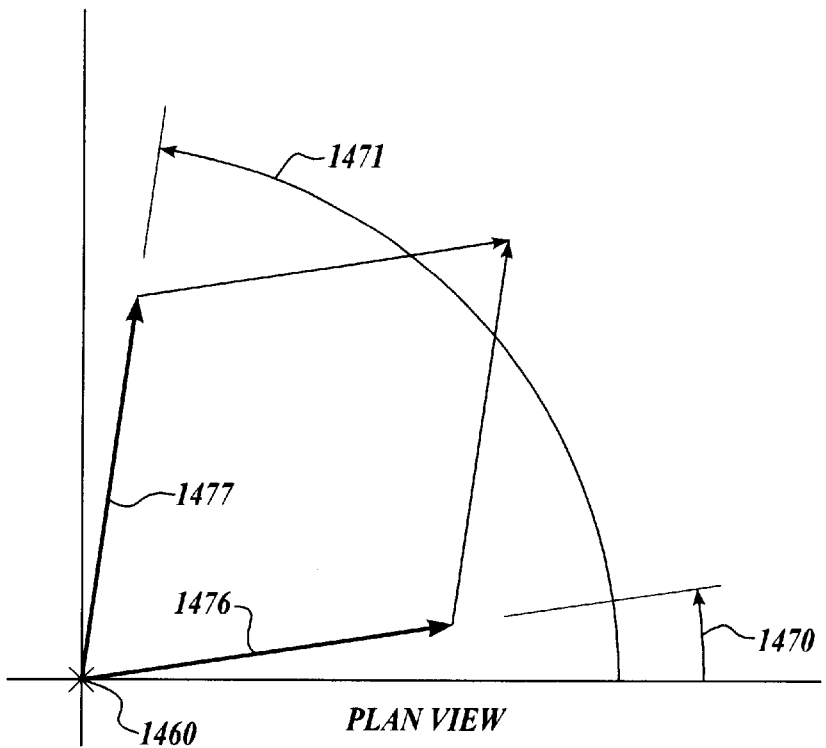
FIG. 10 illustrates a series of vectors useful for describing a rhombus according to an embodiment of the present invention.

When the specified area is a rhombus, a rectangular format can be used to describe a regular rhomboid in local linear coordinates as illustrated in FIG. 10 and Table IIIE-4. As seen in FIG. 10, the description starts with a cornerpoint 1460 defined by a latitude and longitude; two angular directions 1470, 1471 in degrees from the north; and two vector lengths 1476, 1477 in nautical miles.

TABLE IIIE-4

RHOMBUS DESCRIPTION FIELDS

| BYTE | LINEAR BITS | DEFINITION | NOTES |
|---|---|---|---|
| 1–4 | 32:1 | Vertex | See Table IIIE-3 |
| 5 | 40:33 | First Direction | See Table IIIE-5 |
| 6 | 48:41 | First Distance | See Table IIIE-5 |
| 7 | 56:49 | Second Direction | |
| 8 | 64:57 | Second Direction | |

In a preferred embodiment of the invention, directions 1470 and 1471 may be defined according to Table IIIE-5 below.

TABLE IIIE-5

RHOMBUS DISTANCE AND DIRECTION

| Element | Range | Scale factor (LSB) |
|---|---|---|
| Direction | 0 to 179.3 degrees | LSB = 180°/2^8 – 0.703125 degrees Corner point is chosen as southern-most point so that only 1st and 2nd quadrant angles need to be sent. Increases resolution |

TABLE IIIE-5-continued

RHOMBUS DISTANCE AND DIRECTION

| Element | Range | Scale factor (LSB) |
|---------|-------|--------------------|
| Distance | 0 to 127.5 nm | LSB = 0.5 nm<br>If the polygon needs to be more than 127.5 nm on a side, multiple polygons will have to be sent. |

Figure 11:
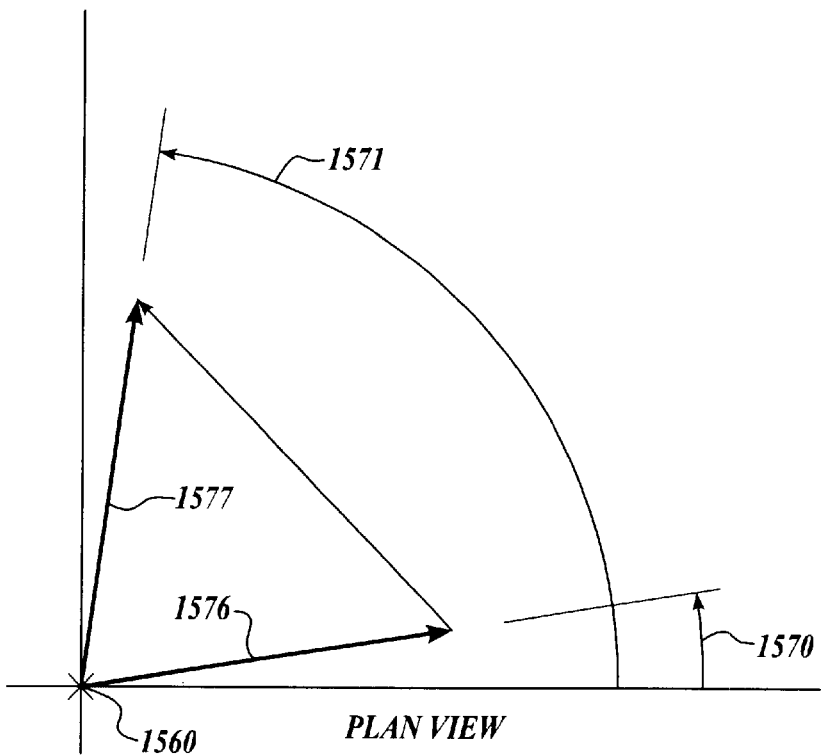
FIG. 11 illustrates a series of vectors useful for describing a triangle according to an embodiment of the present invention.

When the specified area occupied by the weather phenomenon is a triangle, a format such as that described in FIG. 11 and Table IIIE-6. As seen in FIG. 11, the description starts with a corner point 1560 defined by a latitude and a longitude; two angular directions 1570, 1571 in degrees from the north; and two vector lengths 1576, 1577 in nautical miles.

TABLE IIIE-6

TRIANGLE DEFINITION

| BYTE | LINEAR BITS | DEFINITION | NOTES |
|------|-------------|------------|-------|
| 1–4 | 32:1 | Vertex | See Table IIIE-3 |
| 5 | 49L33 | First Direction | See Table IIIE-7 |
| 6 | 48:41 | First Distance | See Table IIIE-7 |
| 7 | 56:49 | Second Direction | |
| 8 | 64:57 | Second Direction | |

The directions 1570 and 1571 of FIG. 11 may be specified according to Table IIIE-7.

TABLE IIIE-7

TRIANGLE DISTANCE AND DIRECTION

| Element | Range | Scale factor (LSB) |
|---------|-------|--------------------|
| Direction | 0 to 179.3 degrees | LSB = $180°/2^8$ = 0.703125 degrees<br>Corner point is chosen as southern-most point so that only 1$^{st}$ and 2$^{nd}$ quadrant angles need to be sent.<br>Increases resolution |
| Distance | 0 to 127.5 nm | LSB = 0.5 nm<br>If the polygon needs to be more than 127.5 nm on a side, multiple polygons will have to be sent. |

For generic polygon shapes other than those described above, the data format of Table IIIE-8 may be used.

TABLE IIIE-8

GENERAL POLYGON DEFINITION

| BYTE | LINEAR BITS | DEFINITION | NOTES |
|------|-------------|------------|-------|
| 1–4 | 32:1 | Vertex | See Table IIIE-3 |
| ⋮ | | | |
| (4N-3)-4N | | Vertex N | |

When the message package data comprises a surface conditions package, the data package contains four blocks as shown in Table IV. Details on the contents of each block are as described in Tables V, VI and IIID and IIIE. Tables IIID and IIIE corresponding to the wind vector and area blocks, respectively, have been previously described. The conditions and expiration blocks of the surface conditions package are described below.

TABLE IV

SURFACE CONDITIONS PACKAGE BLOCK DESCRIPTION

| Block | Notes |
|-------|-------|
| Conditions | See Table V |
| Expiration | See Table VI |
| Wind Vector | See Table IIID |
| Area | See Table IIIE |

The particular surface condition weather phenomenon and its current value are provided in the conditions block of the surface conditions data package. The conditions block is formatted as described in Table V.

TABLE V

CONDITIONS BLOCK

| BYTE | LINEAR BITS | DEFINITION | NOTES |
|------|-------------|------------|-------|
| 1 | 8:1 | Temperature | Degrees C (−64 to 63.5 LSB = 0.5) |
| 2 | 16:9 | Dew Point | Degrees C (−64 to 63.5 LSB = 0.5) |
| 3,4 | 26:17 | Pressure | in Hg (signed number offset from 29.92, LSB = 0.01) |
| 4 | 32:27 | Visibility | Nm (0.25 to 16+) |
| 5 | 36:33 | Sky Cover | $1/8^{th}$s |
| 5 | 40:37 | Spares | |

The expiration block specifies the time interval for which the surface condition data remains valid. The expiration time is defined relative to the time the data was received as per Table VI and in a preferred embodiment has a resolution of 6 minutes.

TABLE VI

EXPIRATION BLOCK

| BYTE | LINEAR BITS | DEFINITION | NOTES |
|------|-------------|------------|-------|
| 1 | 8:1 | Expiration | Relative to receipt (0.1 hrs) |

What is claimed is:

1. An aircraft-based weather information sharing and display system comprising:
   at a ground station:
   reception equipment for receiving weather parameters from a plurality of weather-sensing sources;
   processing equipment for generating a refined weather information report, based on said received weather parameters, using data compression techniques to reduce the size of said weather information report; and
   transmission equipment for uplinking said refined data-compressed weather information report to a plurality of aircraft and
   at an aircraft:
   standard weather information gathering equipment for detecting local weather parameters characterizing a weather condition in the vicinity of the aircraft;
   transmission equipment for transmitting said local weather parameters to said ground station;
   reception equipment for receiving said refined data-compressed weather information report uplinked by said ground station;
   storage equipment for storing received said weather information report and said detected local weather parameters;

picture generating equipment for generating symbolic pictorial information based on the received refined weather information and said detected local weather parameters; and weather information display equipment, coupled to the picture generating equipment, for displaying pictorial polygons indicating the dynamic behavior of said weather condition.

2. The system of claim 1 wherein said pictorial polygons display the predicted dynamic behavior of said weather conditions.

3. The system of claim 1 wherein said dynamic behavior comprises the movement of said weather conditions.

4. The system of claim 1 wherein said dynamic behavior comprises the intensity of said weather conditions.

5. The device of claim 1, wherein said data compression technique further comprises a weather parameter rate such that the frequency of said uplinking of said weather information report is reduced.

6. The device of claim 1, wherein the ground station further comprises a broadcast scheduling equipment that tailors said weather information report to each of said plurality of aircraft, based on a position of each of said aircraft, such that the length of said weather information report is reduced.

7. The device of claim 1, wherein said data compression technique comprises extracting salient features of said refined weather information, and inputting said salient features into said weather information report.

8. The device of claim 1, wherein said data compression technique comprises formatting said weather information report in an Aviation Weather Information Network format.

9. The device of claim 1, further comprising equipment on said aircraft that generates an alert to the aircraft pilot when said processing equipment detects a dangerous weather phenomenon.

10. A method for displaying the dynamic behavior of a weather condition on an aircraft display comprising the steps of:

receiving a refined data-compressed weather information report uplinked by a weather ground station;

decompressing said refined data-compressed weather information report;

storing said received refined decompressed weather information report;

generating symbolic pictorial information based on said received weather information report utilizing standard picture generating equipment already installed on the aircraft; and displaying pictorial symbols indicating the dynamic behavior of said weather condition using EFIS or weather radar display equipment already installed on the aircraft.

11. The method of claim 10 wherein said step of displaying comprises:

displaying the area surrounding the aircraft's flight path; and displaying polygons representing the predicted dynamic behavior of significant weather formations, based on said uplinked weather information, relative to said flight path such that a pilot may navigate away from dangerous weather.

12. The method of claim 10 wherein said step of displaying comprises overlaying said pictorial symbols over a locally-received weather radar return display.

13. A method for providing weather data to an aircraft comprising the steps of:

receiving a weather data including a description of at least one weather phenomenon;

identifying a coasting interval for said weather phenomenon;

transmitting to the aircraft said weather data including said description as a function of said coasting interval.

14. The method of claim 13 wherein said description includes a rate data of said phenomenon.

15. A computer program product for providing weather data to an aircraft comprising:

a computer readable storage medium having computer readable program code means embodied in said medium, said computer readable program code means comprising:

a first computer instruction means for receiving a weather data including a description of at least one weather phenomenon;

a second computer instruction means for identifying a coasting interval for said weather phenomenon;

a third computer instruction means for controlling transmission of said weather data including said description to the aircraft as a function of said coasting interval.

16. The computer program product of claim 15 wherein said description includes a rate data of said phenomenon.

17. An apparatus for providing weather data to an aircraft comprising:

an input coupled to receive signals indicative of a weather data including a description of at least one weather phenomenon;

an output; and a signal processor, coupled to said input and to said output, for:

identifying a coasting interval for said weather phenomenon; and controlling transmission of said weather data including said description to the aircraft as a function of said coasting interval.

18. The apparatus of claim 17 wherein said signal processor comprises a general purpose processor.

19. A method for providing weather data to an aircraft comprising:

receiving a plurality of weather data including a description of at least one weather phenomenon and a phenomenon rate data;

forming a weather model from said plurality of weather data;

transmitting said weather model and said rate data to the aircraft.

20. The method of claim 19 wherein said step of forming a weather model further comprises the step of comparing said plurality of weather data to a geo-referenced image.

21. The method of claim 19 wherein said step of forming a weather model further comprises the steps of:

comparing an individual one of said plurality of weather data to another one of said plurality of weather data; and quantifying an error in said plurality of weather data using said comparing step; and obtaining a single description of said weather phenomenon.

22. The method of claim 19 wherein said step of transmitting comprises transmitting on an aircraft VHF frequency.

23. The method of claim 19 wherein said step of transmitting a weather model further comprises the step of transmitting a geometric shape description defining at least an area occupied by said weather phenomenon.

24. The method of claim 19 wherein said step of transmitting a weather model further comprises the step of transmitting a compressed image file.

25. A computer program product for providing weather data to an aircraft comprising:
- a computer readable storage medium having computer readable program code means embodied in said medium, said computer readable program code means comprising:
- a first computer instruction means for reading a plurality of weather data including a description of at least one weather phenomenon and a phenomenon rate data;
- a second computer instruction means for forming a weather model from said plurality of weather data;
- a third computer instruction means for controlling transmission of said weather model and said rate data to the aircraft.

26. The computer program product of claim 25 wherein said second computer instruction means further includes a fourth computer instruction means for comparing said plurality of weather data to a geo-referenced image.

27. The computer program product of claim 25 wherein said second computer instruction means further includes:
- a fourth computer instruction means for comparing an individual one of said plurality of weather data to another one of said plurality of weather data; and
- a fifth computer instruction means for quantifying an error in said plurality of weather data using said comparing step; and
- a sixth computer instruction means for obtaining a single description of said weather phenomenon.

28. The computer program product of claim 25 wherein said third computer instruction means further includes a fourth computer instruction means for formatting a data message to be transmitted wherein said data message includes a geometric shape description defining at least an area occupied by said weather phenomenon.

29. The computer program product of claim 25 wherein said third computer instruction means includes a fourth computer instruction means for formatting said weather model as a compressed image file.

30. An apparatus for providing weather data to an aircraft comprising:
- an input coupled to receive a plurality of weather data including a description of at least one weather phenomenon and a phenomenon rate data;
- an output; and
- a signal processor coupled to said input and to said output for:
  - forming a weather model from said plurality of weather data;
  - outputting a control signal to control transmission of said weather model and said rate data to the aircraft.

31. The apparatus of claim 30 wherein said signal processor comprises a general purpose processor.

32. The apparatus of claim 30 wherein said weather model comprises a compressed image file.

33. The apparatus of claim 30 wherein said control signal comprises a signal useful for controlling transmission of said weather model and said rate data on a VHF transmitter.

34. The apparatus of claim 30 wherein said signal processor further operates to:
- compare an individual one of said plurality of weather data to another one of said plurality of weather data; and
- quantify an error in said plurality of weather data using said comparing step; and
- obtain a single description of said weather phenomenon from said plurality of weather data.

35. The apparatus of claim 30 wherein said control signal includes a data message describing a geometric area containing said weather phenomenon.

36. The apparatus of claim 30 wherein said signal processor further operates to compare said plurality of weather data to a geo-referenced image.

* * * * *